US012461952B1

United States Patent
Vidyaratne et al.

(10) Patent No.: US 12,461,952 B1
(45) Date of Patent: Nov. 4, 2025

(54) SYSTEMS AND METHOD FOR CONSTRUCTING TROUBLESHOOTING TREES

(71) Applicant: Hitachi, Ltd., Tokyo (JP)

(72) Inventors: Lasitha Vidyaratne, Fremont, CA (US); Xian Yeow Lee, Santa Clara, CA (US); Aman Kumar, San Jose, CA (US); Tsubasa Watanabe, Spring Lake, MI (US); Dipanjan Ghosh, Santa Clara, CA (US); Ahmed Farahat, Santa Clara, CA (US); Chetan Gupta, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/744,398

(22) Filed: Jun. 14, 2024

(51) Int. Cl.
*G06F 16/00* (2019.01)
*G06F 16/31* (2019.01)
*G06F 16/338* (2019.01)
*G06F 16/383* (2019.01)
*G06F 40/205* (2020.01)

(52) U.S. Cl.
CPC .......... *G06F 16/322* (2019.01); *G06F 16/338* (2019.01); *G06F 16/383* (2019.01); *G06F 40/205* (2020.01)

(58) Field of Classification Search
None
See application file for complete search history.

(56) References Cited

U.S. PATENT DOCUMENTS

2019/0103111 A1* 4/2019 Tiwari ............... G06F 16/3329

OTHER PUBLICATIONS

T. Wolf et al., "Transformers: State-of-the-art natural language processing," in Proceedings of the 2020 conference on empirical methods in natural language processing: system demonstrations, 2020, pp. 38-45, 8 pages, Jul. 2020.
I. Dergaa, K. Chamari, p. Zmijewski, and H. B. Saad, "From human writing to artificial intelligence generated text: examining the prospects and potential threats of ChatGPT in academic writing," Biology of Sport, vol. 40, No. 2, pp. 615-622, 2023, 8 Pages, Feb. 2023.

(Continued)

*Primary Examiner* — Tuankhanh D Phan
(74) *Attorney, Agent, or Firm* — Procopio, Cory, Hargreaves & Savitch LLP (57) ABSTRACT

Systems and methods for constructing an equipment troubleshooting tree involve receiving an unstructured text source and using a parsing tool to segment it into sections that are associated with equipment components, units, or processes. If the parsing tool fails, a pre-trained language model is used to identify the sections using the extracted listing as content. Metadata, including section-specific text and page ranges, are obtained for each section. A non-static process enhances similarity matching, resulting in segmented data. An indexing process embeds this data, along with the metadata, into index nodes to improve retrieval efficiency. The pre-trained language model generates a catalog of false, causes, or repair recommendations, which are structured as index notes in the troubleshooting tree. In response to a user query, the constructed troubleshooting tree is generated and output after a grounding process cross-references it with the unstructured text to ensure accuracy.

20 Claims, 6 Drawing Sheets

(56) References Cited

OTHER PUBLICATIONS

L. Wang et al., "Document-level machine translation with large language models," arXiv preprint arXiv:2304.02210, 2023, 16 pages, Oct. 2023.

A. Kumar and B. Starly, ""FabNER": information extraction from manufacturing process science domain literature using named entity recognition," Journal of Intelligent Manufacturing, vol. 33, No. 8, pp. 2393-2407, 2022, 16 pages, Jun. 2021.

W. S. El-Kassas, C. R. Salama, A. A. Rafea, and H. K. Mohamed, "Automatic text summarization: A comprehensive survey," Expert systems with applications, vol. 165, p. 113679, 2021, 47 pages, Mar. 2021.

T. Brown et al., "Language models are few-shot learners," Advances in neural information processing systems, vol. 33, pp. 1877-1901, 2020, 75 pages, Jul. 2020.

C. Wang, X. Liu, and D. Song, "Language models are open knowledge graphs," arXiv preprint arXiv:2010.11967, 2020, 30 pages, Oct. 2020.

S. Hao et al., "BertNet: Harvesting Knowledge Graphs with Arbitrary Relations from Pretrained Language Models," in Findings of the Association for Computational Linguistics: ACL 2023, 2023, pp. 5000-5015, Jun. 2023.

V. Shenoy, R. Wenger, and K. Kari. "GraphGPT." GitHub. https://github.com/varunshenoy/GraphGPT, accessed Jun. 14, 2024, 3 pages, Jan. 2023.

\* cited by examiner

SYSTEMS AND METHOD FOR CONSTRUCTING TROUBLESHOOTING TREES

BACKGROUND

Field

The present disclosure is generally directed to hierarchical data structures, and more specifically, to systems and methods hierarchical data structures for creating, organizing, and representing information in the form of trouble shooting trees and similar data structures.

Related Art

Constructing a troubleshooting tree for a particular device or system is a rigorous process requiring the collaboration of multidisciplinary teams, including engineers, domain experts, and technicians. This process typically begins with a comprehensive analysis of the system's architecture, operation, and known failure modes. It involves consulting equipment manuals, historical maintenance records, and input from subject matter experts to extract the relevant information and map to a meaningful representation of the troubleshooting tree in an organized fashion. Information gathered from these sources is used to draft an initial tree structure. Subsequently, it is refined through iterative testing and validation, incorporating real-world data and feedback from field personnel. This collaborative effort ensures that the troubleshooting tree is an accurate, reliable, and adaptable resource for addressing issues swiftly and effectively.

In an industrial context, a troubleshooting tree serves as a crucial tool for fault analysis and diagnosis within complex systems and processes. The troubleshooting tree is a graphical representation that visualizes a decision-making process and can be used to identify and rectify issues affecting industrial machines or operations, thereby reducing downtime. Each node in the tree represents a specific diagnostic test or observation, and branches stemming from these nodes delineate potential outcomes or diagnostic steps. By following the logical flow of the tree in a step-by-step approach, technicians and engineers can efficiently use questions, decisions, or tests to identify faults and pinpoint the root cause of problems, e.g., to streamline maintenance procedures. Additionally, troubleshooting trees can be useful in training new personnel, as they provide a standardized and comprehensible path for systematic troubleshooting.

In practice, constructing troubleshooting trees is a tedious process that may take several months to ensure the reliability of the information included in the troubleshooting tree, which is important for verification purposes.

Therefore, it is desirable to have greatly expedited systems and methods that can extract and structure information from unstructured text sources to automatically construct an initial instance of a troubleshooting tree.

SUMMARY

In some aspects of the disclosure, method for constructing an equipment troubleshooting tree comprises: at a preprocessing pipeline, receiving an unstructured text source including sections; using a parsing tool to segment the unstructured text source to extract a listing of sections, each section being associated with at least one of a component of an equipment, a unit, or a process; in response to determining that the parsing tool has not fully extracted the listing, performing steps including: providing the unstructured text source to a pre-trained language model; and instructing the pre-trained language model to identify each section, by using the listing of sections as a context; for each section, performing steps including: obtaining metadata including a section-specific text and a corresponding page range associated with the unstructured text source; and applying a non-static process, which enhances a coherency of a similarity matching, to preprocess the section to obtain segmented data; using an indexing process that increases a retrieval efficiency in a troubleshooting tree constructing pipeline by embedding the segmented data and the metadata into index nodes; using the index nodes in the troubleshooting tree constructing pipeline, which performs steps including, for each component: using the pre-trained language model to generate a catalog including a fault, a cause, or repair recommendation; and structuring at least some of them as nodes of the troubleshooting tree; in response to at least one of the equipment, the unit, or the process being queried by a user query, generating the troubleshooting tree; using the metadata in a grounding process that evaluates an accuracy of the troubleshooting tree, the grounding process including cross-referencing at least some of the troubleshooting tree with the unstructured text source; and outputting the troubleshooting tree.

In some aspects, one or more of the index nodes includes pre-processed textual data.

In some aspects, the method further comprises extracting new text data from updated unstructured text; using the pre-trained language model to generate a troubleshooting branch that is associated with previously unidentified issues; integrating the troubleshooting branch into the troubleshooting tree to obtain an updated troubleshooting tree; and verifying the troubleshooting tree against new source material to enhance an accuracy.

In some aspects, the troubleshooting tree is structured to facilitate expansion and enhancement using data from previously unseen unstructured text sources.

In some aspects, the user query includes a prompt to generate, for one of more steps, an output, e.g., a Python list, comprising at least one of the component, the fault, the cause, or the repair recommendation.

In some aspects, the unstructured text sources include at least one of a service log, a service manual, or an owner manual.

In some aspects, instructing the pre-trained language model to identify each section includes instructing the pre-trained language model to identify each section as a set of separate documents.

In some aspects, the pre-trained language model employs a retrieval augmented generation process that retrieves information.

In some aspects, the grounding process further includes evaluating an output of the pre-trained language model against a context that is used to retrieve the information, or providing references to one or more of the sections, which contains information that enables a user verification of the accuracy of the troubleshooting tree to improve an output accuracy.

In some aspects, the techniques described herein relate to a non-transitory computer-readable medium for storing instructions for executing a process, the instructions including: at a preprocessing pipeline, receiving an unstructured text source including sections; using a parsing tool to segment the unstructured text source to extract a listing of sections, each section being associated with at least one of a component of an equipment, a unit, or a process; in response to determining that the parsing tool has not fully extracted the listing, performing steps including: providing the unstructured text source to a pre-trained language model; and instructing the pre-trained language model to identify each section, by using the listing of sections as a context; for each section, performing steps including: obtaining metadata including a section-specific text and a corresponding page range associated with the unstructured text source; and applying a non-static process, which enhances a coherency of a similarity matching, to preprocess the section to obtain segmented data; using an indexing process that increases a retrieval efficiency in a troubleshooting tree constructing pipeline by embedding the segmented data and the metadata into index nodes; using the index nodes in the troubleshooting tree constructing pipeline, which performs steps including, for each component: using the pre-trained language model to generate a catalog including a fault, a cause, or repair recommendation; and structuring at least some of them as nodes of the troubleshooting tree; in response to at least one of the equipment, the unit, or the process being queried by a user query, generating the troubleshooting tree; using the metadata in a grounding process that evaluates an accuracy of the troubleshooting tree, the grounding process including cross-referencing at least some of the troubleshooting tree with the unstructured text source; and outputting the troubleshooting tree.

Aspects of the present disclosure can involve a system, which can involve means for constructing an equipment troubleshooting tree that comprise: means for receiving, at a preprocessing pipeline, an unstructured text source including sections; means for segmenting the unstructured text source to extract a listing of sections, each section being associated with at least one of a component of an equipment, a unit, or a process; means for performing steps including: providing the unstructured text source to a pre-trained language model; and instructing the pre-trained language model to identify each section, by using the listing of sections as a context; means for performing steps, for each section, including: obtaining metadata including a section-specific text and a corresponding page range associated with the unstructured text source; and applying a non-static process, which enhances a coherency of a similarity matching, to preprocess the section to obtain segmented data; means for using an indexing process that increases a retrieval efficiency in a troubleshooting tree constructing pipeline by embedding the segmented data and the metadata into index nodes; means for using the index nodes in the troubleshooting tree constructing pipeline, which performs steps including, for each component: using the pre-trained language model to generate a catalog including a fault, a cause, or repair recommendation; and structuring at least some of them as nodes of the troubleshooting tree; means for, in response to at least one of the equipment, the unit, or the process being queried by a user query, generating the troubleshooting tree, using the metadata in a grounding process that evaluates an accuracy of the troubleshooting tree, the grounding process including cross-referencing at least some of the troubleshooting tree with the unstructured text source; and means for outputting the troubleshooting tree.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations. In this document the terms "troubleshooting tree" and "diagnostic tree" are used interchangeably.

Figure 1:
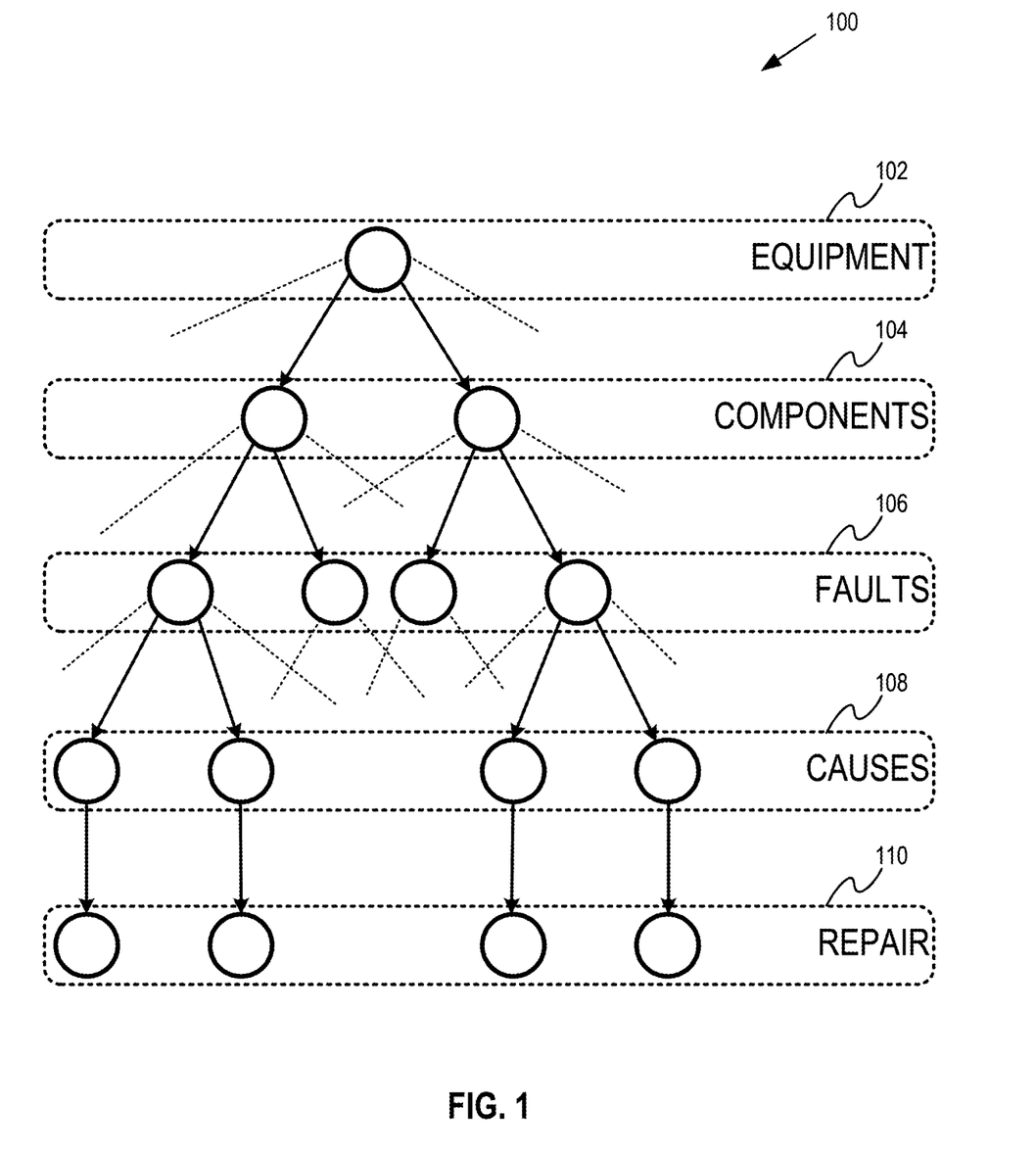
FIG. 1 depicts a general hierarchical troubleshooting tree structure.

FIG. 1 depicts a general hierarchical troubleshooting tree structure. Troubleshooting tree structure 100 comprises nodes that each represent a piece of information or a concept and further comprises branches (edges) of structure 100 that denote relationships between parent and child nodes. Structure 100 in FIG. 1 provides clear (single) paths from a root node to all other nodes, with each node, except the root node, having one parent node. Conversely, each parent node has a one-to-many relationship with its child nodes.

It is noted that although troubleshooting tree structure 100 is a four-stage structure, the depth of troubleshooting tree structure 100 can vary depending on the complexity of the information. It is further noted that, unlike non-hierarchical, graph-like knowledge graphs, the edges in well-defined troubleshooting tree structure 100 do not need to be labeled to indicate the interrelationships and single-parent child connections between nodes.

As depicted in FIG. 1, exemplary troubleshooting tree structure 100 comprises, in first stage 102, a root node section wherein the root node represents a piece of equipment. Second stage 104 represents components of the machine or equipment. Third stage 106 identifies possible faults. Fourth stage 108 represents possible causes for the faults. And final stage, 110, provides recommended repair process.

Although the highest node 102 of troubleshooting tree 100 represents the equipment itself, the nodes relevant for troubleshooting start with a component or part of the equipment/system. Therefore, component node 104 is hereinafter referred to as a root node. At this level in tree 100, a technician may select the most relevant root node for an issue to commence the troubleshooting process. The nodes in second stage 104 outline possible faults that may occur in the component, enabling the technician to conduct relevant tests to identify a specific underlying fault in a system. If nodes in third stage 106 represent all possible causes that may have resulted in the fault identified in the second stage, this may guide the technician to conduct directed tests to isolate the specific cause. Final stage 110 identifies recommended repair actions to remedy the corresponding causes that have been identified in previous stage 108. It is noted that the breadth and depth of troubleshooting tree 100 in FIG. 1 is merely an example, and suitable troubleshooting trees may have any arbitrary breadth or depth, depending on the requirements of a particular application.

It is known that LLMs are a machine learning models designed to produce text that closely resembles human language. These models operate by calculating the likelihood of a series of tokens within a text, where a token represents the most granular element of text, such as a word, sub-word, character, or byte. The utility of language models spans a broad spectrum, including tasks such as natural language comprehension, generation of text that mimics human writing, language translation, entity recognition, text summarization, and question-answering.

LLMs have not been used in the context of directly generating troubleshooting trees; instead, they generate knowledge graphs (KGs), which lack the rich causal information found in troubleshooting trees. Further, LLMs have a context limit, i.e., a finite number of tokens that can be used as input and output (e.g., 8192 tokens for GPT-4). However, many documents such as service manuals oftentimes contain text that far exceeds the limits set for LLMs. A possible workaround is to utilize retrieval augmented generation (RAG).

Figure 2:
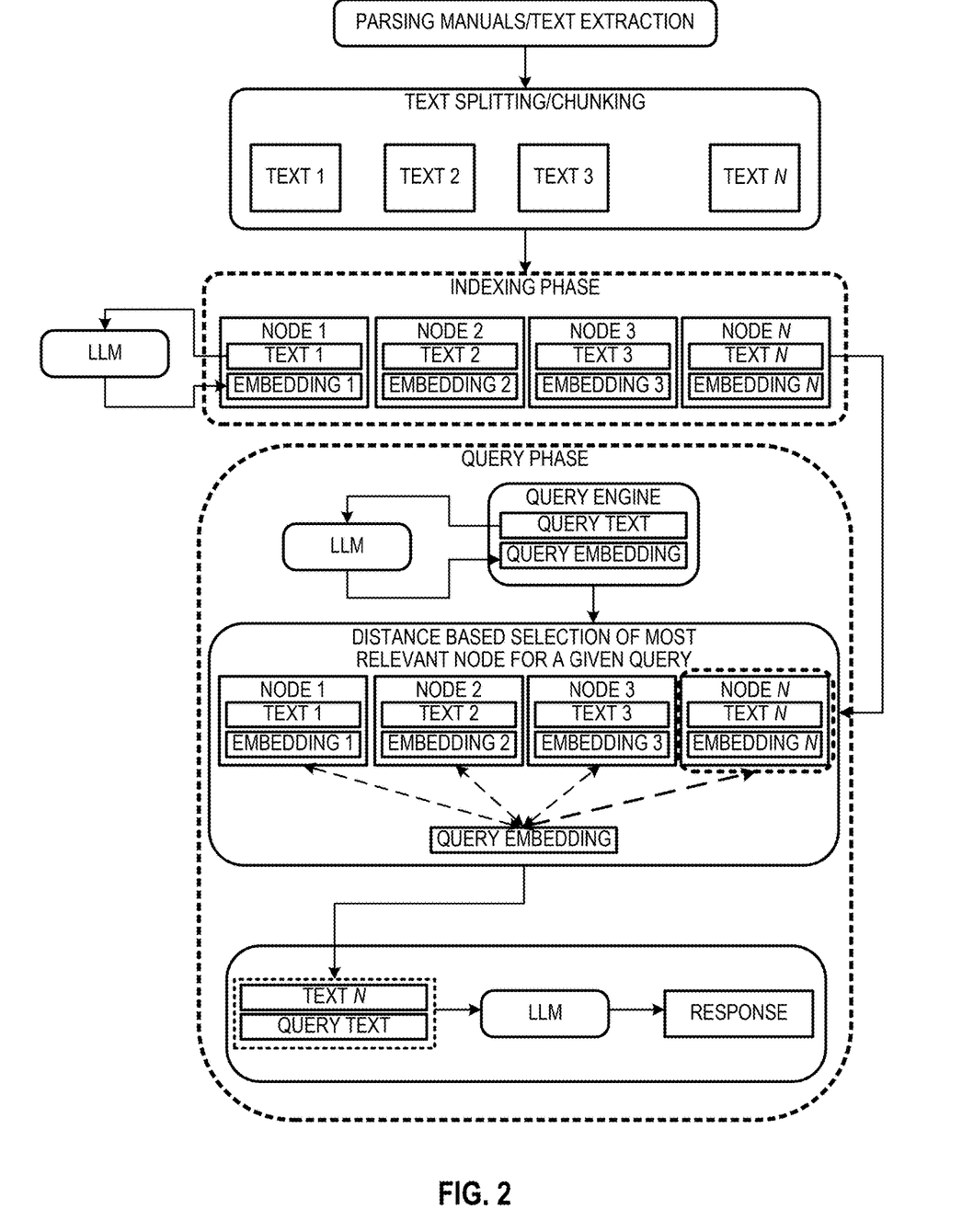
FIG. 2 illustrates a typical pipeline for retrieval augmented generation (RAG).

FIG. 2 illustrates a typical RAG pipeline, which integrates an information retrieval mechanism to identify and fetch, based on a user query, only the most relevant contextual information from a large external data source. Subsequently, the relatively smaller batch of documents, along with the original user query, serves as input to an LLM, forming an enriched context that produces a more coherent and relevant response.

Various embodiments herein utilize preprocessing methods that consider the basic structure of service manuals. An exemplary preprocessing method comprises segmenting text based on sections or subsections of a manual. Sections of a service manual are typically based on a single component, a unit, or a particular process associated with the machine. Most queries on service manuals tend to be directed at a particular component or a process. Section-based text chunking ensures that the LLM can access context of a full component or process when generating the output, thereby reducing incompleteness. In embodiments, sections may be identified and section-specific text may be extracted as separate documents (or chunks) with little or no human intervention.

Figure 3:
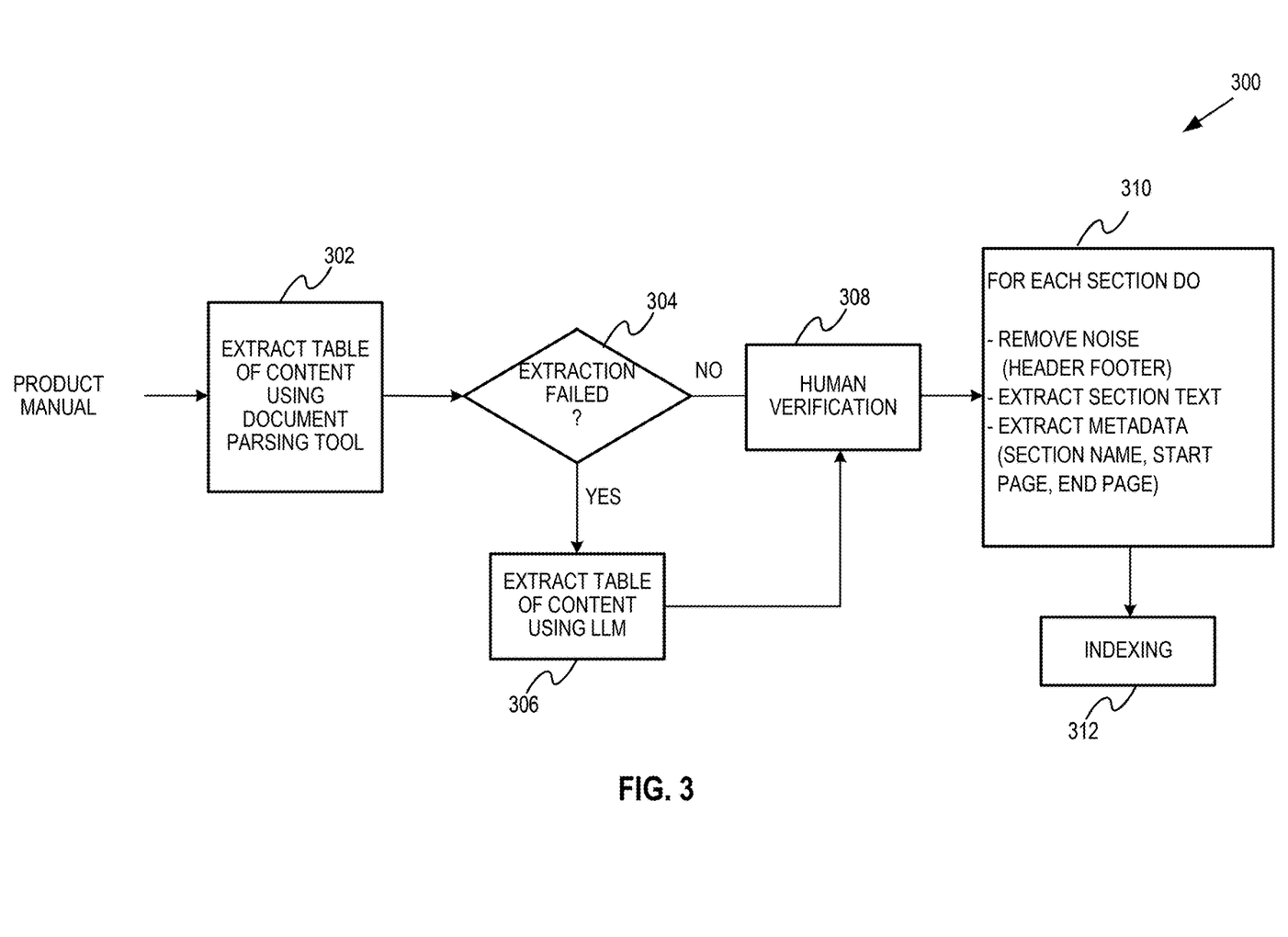
FIG. 3 illustrates an exemplary text preprocessing and indexing pipeline diagram according to various embodiments of the present disclosure.

FIG. 3 illustrates an exemplary text preprocessing and indexing pipeline diagram according to various embodiments of the present disclosure. At step 302, a document parsing tool is used to extract the table of contents from a product service manual. And at step 304, it is determined whether the attempt to extract the table of contents has failed. If so, at step 306, an LLM is leveraged to extract section names and corresponding page numbers, followed by human verification of the result at step 308. At step 310, for each section, metadata (e.g., section name, start and end page numbers) is collected and included within index nodes during indexing. This metadata may be used for output grounding. Finally, at step 312, preprocessed and indexed textual data may be used in the troubleshooting tree construction pipeline.

In embodiments, a troubleshooting tree construction process may comprise a structured information extraction task. Following the structure of a troubleshooting tree shown in FIG. 1, embodiments may generate a troubleshooting tree construction pipeline that extracts information through the layers of the troubleshooting tree in a depth-first manner. The pipeline may construct a fault tree in a two-step approach. For example, given a particular document, step 1 may represent generating a list of components/parts or systems as root nodes, and step 2 may represent generating a fault tree branch for each of the components generated at step 1.

In embodiments, Step 1 may use the entire context (e.g., the full text of a service manual) of EQUIPMENT as input along with a prompt to an LLM to generate a list of components or parts that make up a piece of equipment. An example prompt for step 1 may be constructed as follows:

"Build a troubleshooting tree guide for an [EQUIPMENT] using the provided service manual. First, use the service manual as context to list all major physical parts and components of the [EQUIPMENT]. Then, identify and list all major physical components (i.e., machine parts) of the [EQUIPMENT]. Finally, output a python list of major parts according to this example: ['Engine', 'Hydraulic System']"

This particular prompt is structured to first provide the LLM an overall idea of the task, and instructions to identify and extract targeted information from a given context. Finally, the prompt provides instructions on how to produce an output, along with an example. The output list of components identified in step 1 may be used as the root node of a troubleshooting tree, such as that shown in FIG. 1.

In embodiments, given a root node that represents a component or part in the [EQUIPMENT], Step 2 may comprise extracting information to represent subsequent nodes in the branch. Two exemplary structured prompting-based processes are presented to perform this step.

A first process, Process 1, performs targeted information extraction for each subsequent node of the troubleshooting tree in a depth-first manner.

---

Process 1

---

1. Preprocessing and informed text chunking
Step 1
2. Index the text using 'list indexing'
3. Generate the list of components/parts of [EQUIPMENT]
Step 2
4. For each COMPONENT:
    Prompt: Build a troubleshooting tree for an [EQUIPMENT], by using the service manual as context, to identify all possible faults that can occur in the [COMPONENT] of the [EQUIPMENT].
    Identify and list all possible faults that can occur in [COMPONENT] of the [EQUIPMENT] using the provided context. Output a python list of faults in the following format: ['fault 1', 'fault 2'].
5. For each FAULT:
    Prompt: Build a troubleshooting tree for the [EQUIPMENT] using the service manual. Identify and list all possible causes that results in the fault [FAULT] that can occur in [COMPONENT] of the [EQUIPMENT] using the provided context. Output a python list of causes in the following format: ['cause 1', 'cause 2']"
6. For each CAUSE:
    Prompt: "Identify the repair method for the cause [CAUSE] that results in the fault [FAULT] that occur in [COMPONENT] of the [EQUIPMENT] using the provided context. Output only the most relevant repair recommendation method. The output must be formatted as a python list variable. An example output would be: ['repair recommendation']"

| Process 1 |
| --- |
| 7. Aggregate all extracted information and structure as a troubleshooting tree.
8. Possible human intervention for formatting errors and cleaning for overlapping information. |

The method proposed in Process 1 provides a methodical, step-by-step prompting structure to extract data at each level. The prompting is tailored to extract information specific to each level, along with instructions on how to format the output. This ensures that the output of the LLM is structured in a consistent way for aggregation and post processing.

In certain applications, the formulation of recursive prompting proposed in Process 1 can quickly become expensive, e.g., for large input service manuals.

Therefore, various embodiments leverage the capabilities of a powerful LLM, such as GPT-4, to understand and follow complex structured prompts and use direct prompting to generate a troubleshooting tree branch, instead of step-by-step information extraction, as outlined in Process 2 below.

| Process 2 |
| --- |
| 1. Preprocessing and informed text chunking
Step 1
2. Index the text using 'list indexing'
3. Generate the list of components/parts of [EQUIPMENT]
Step 2
4. For each COMPONENT:
    Prompt: Construct a troubleshooting tree to investigate problems
    that may occur in [COMPONENT] of [EQUIPMENT] using
    given context. Output only a table representing a fault tree.
    The table should be formatted as follows:
    The first column of the table, titled 'Component', should have the
    component name with empty cells filled with NaN.
    Each row in the second column of the table with column title
    'Possible Fault' should have all possible faults can may occur in
    [COMPONENT] with empty cells filled with NaN.
    Each row in the third column of the table with column title
    'Possible Cause' should have all possible causes related to
    each corresponding fault mentioned in the second column.
    The fourth column titled 'Repair Recommendation' should
    specify the repair recommendation for each corresponding
    cause in the third column.
    If a troubleshooting tree cannot be constructed according to the
    specified issue by using the given context, respond with 'None.'
5. Aggregate all extracted information and structure as a
    troubleshooting tree.
6. Possible human intervention for formatting errors and cleaning for
    overlapping information. |

The method proposed in Process 2 greatly simplifies the troubleshooting tree generation process by avoiding the recursive prompting used in Process 1. However, the resulting prompt is relatively more complex and relies on the ability of the LLM to understand the general concept of a "troubleshooting tree" and the specific formatting instructions.

Figure 4:
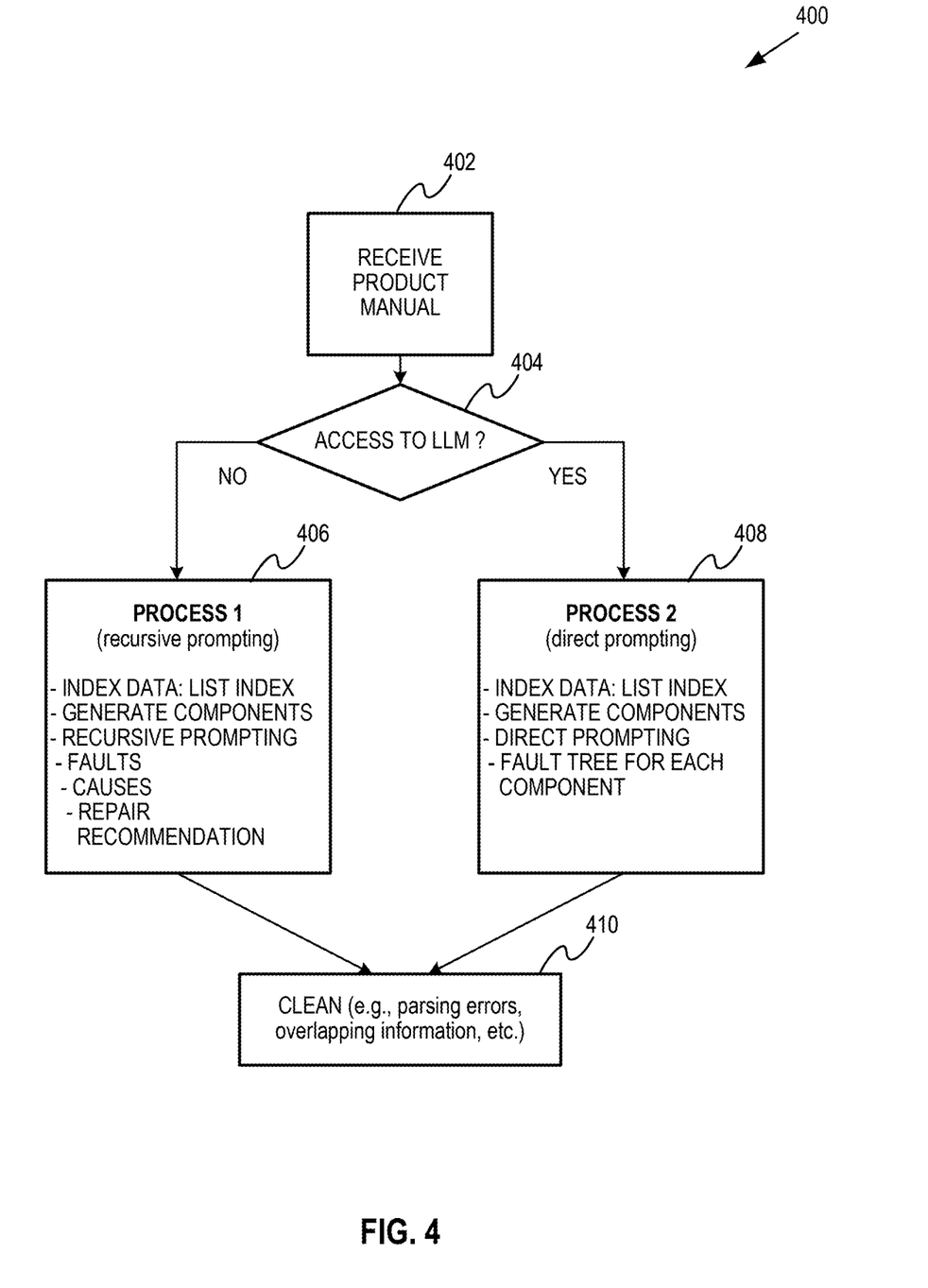
FIG. 4 is a flowchart illustrating an exemplary process for constructing an equipment troubleshooting tree using a large language model (LLM) in accordance with various embodiments of the present disclosure.

FIG. 4 is a flowchart illustrating an exemplary process for constructing an equipment troubleshooting tree using an LLM in accordance with various embodiments of the present disclosure. In embodiments, process 400 begins at step 402, when a preprocessing pipeline receives an unstructured text.

At step 404, it is determined whether process 400 has access to a state-of-the-art LLM. If not, then at step 406, process 400 will apply Process 1. Otherwise, process 400 will resume with step 406, which applies Process 2.

In embodiments, Process 1 is a recursive prompting process that involves indexing data, generating components, and recursive iteratively prompting for false causes, and repair recommendations. The pipeline for Process 1 utilizes prompts having a relatively simpler structure when compared to Process 2 and exhaustive information extraction for high coverage rate. System performance typically improves proportional to the capacity of the LLM employed.

Conversely, Process 2 is a direct prompting process that involves indexing data, generating components, and direct prompting for fault trees for each component causes. Process 2 utilizes a prompt having a relatively complex structure that works best on advanced LLM's. Process 2 the rates faster, consumes less resources, and May have less coverage rate.

At step 408, the output of the respective process is cleaned for parsing errors and overlapping information. Table 1 below illustrates an exemplary troubleshooting tree branch that has been generated according to various embodiments herein.

It is noted that since LLMs are known to be prone to generating erroneous or irrelevant information, unlike conventional troubleshooting trees are built and verified by engineers, for embodiment that utilize LLMs herein, it is desirable to have systems and methods to verify their accuracy to obtain reliable information-a key aspect in industrial applications. Accordingly, various embodiments may ground information extracted for each node to the source material. To accomplish this, the output of an LLM at each node may be evaluated against the context it used to retrieve the information. Such evaluation may further be accomplished by utilizing section and/or subsection metadata that is maintained through the preprocessing pipeline (FIG. 2) to provide reference to, e.g., the section of a service manual that contains the relevant information. In this manner, the user can advantageously relatively easily verify the accuracy of the information associated with each entry, e.g., by detecting hallucinations, thereby improving the reliability of the output.

TABLE 1

| Component | Fault | Cause | Repair Recommendation |
| --- | --- | --- | --- |
| Engine | Quantity and contamination of engine oil and coolant (section: Daily Inspection pages: 132 to 134 section: Daily Inspection pages: 132 to 134 section: Check Machine After Starting Engine pages: 83 to 84) | Insufficient quantity of engine oil (section: Daily Inspection pages: 132 to 134 section: Daily Inspection pages: 132 to 134 section: Check Machine After Starting Engine pages: 83 to 84) | Check the oil level every day before starting the machine. Oil level must be between the marks on oil level gauge (1). If necessary, add the specified engine oil via oil filler (2). Re-check the oil level after refilling. (section: Daily Inspection pages: 132 to 134 section: B. Engine pages: 147 to 150) |
| | | Contamination of engine oil (section: Daily Inspection pages: 132 to 134 section: Daily Inspection pages: 132 to 134 section: Check Machine After Starting Engine pages: 83 to 84) | Inspect the engine oil and coolant levels and check for any contamination. If contamination is found, drain, and replace the engine oil and coolant. Also, inspect for any leaks in the hoses and pipes and repair or replace them if necessary. (section: Daily Inspection pages: 132 to 134 section: Procedures pages: 127 to 128) |

TABLE 1-continued

| Component Fault | Cause | Repair Recommendation |
|---|---|---|
| | Insufficient quantity of coolant (section: Daily Inspection pages: 132 to 134 section: Daily Inspection pages: 132 to 134 section: Check Machine After Starting Engine pages: 83 to 84) | Check the coolant level and add coolant if necessary. (section: Daily Inspection pages: 132 to 134 section: Procedures pages: 127 to 128) |
| | Contamination of coolant (section: Daily Inspection pages: 132 to 134 section: Daily Inspection pages: 132 to 134 section: Check Machine After Starting Engine pages: 83 to 84) | Inspect the coolant for contamination and replace if necessary. (section: Daily Inspection pages: 132 to 134 section: Procedures pages: 127 to 128) |

As shown in Table 1, given a particular component, each particular fault may branch out into several causes, each leading to specific repair actions or recommendations.

It is noted that although the invention is generally described in the context of creating and displaying an equipment troubleshooting tree as a troubleshooting chart that aid in decision making processes, it is understood that this is not intended to limit the scope of the present disclosure to such embodiments as the systems and methods for troubleshooting tree described herein may be used in any other type of classification system. Some embodiments can be applied to enhance or expand an existing troubleshooting tree and involve documentation of issues such as repair logs and maintenance logs. For example, in embodiments, new text data may be extracted from updated unstructured text and the a pre-trained language model may be used to generate a troubleshooting branch that is associated with previously unidentified issues. That branch may then be integrated into the troubleshooting tree to obtain an updated troubleshooting tree. Further, the troubleshooting tree may be verified against new source material to enhance an accuracy.

Figure 5:
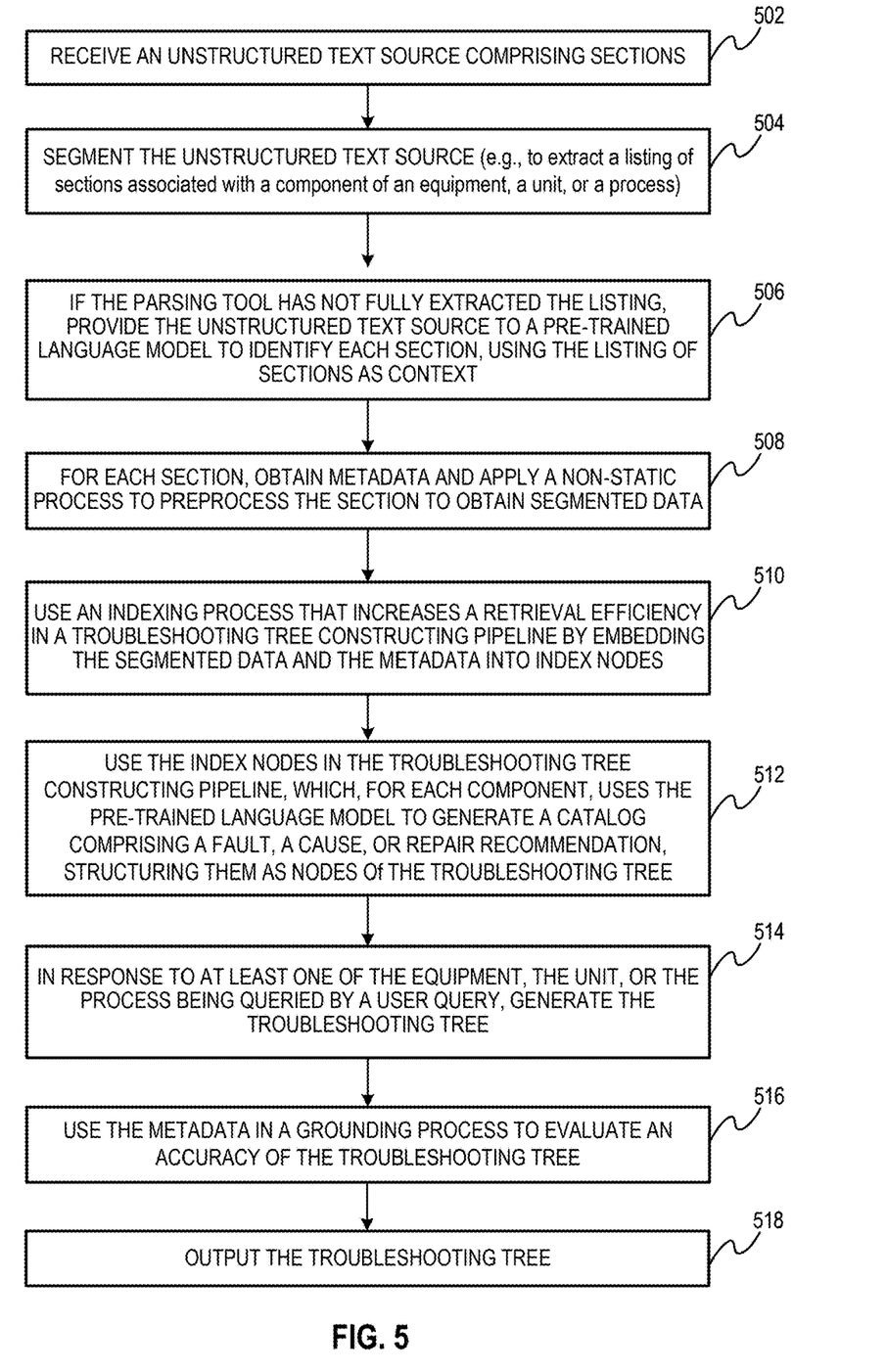
FIG. 5 is a flowchart illustrating an exemplary process for constructing an equipment troubleshooting tree in accordance with various embodiments of the present disclosure.

FIG. 5 is a flowchart illustrating an exemplary process for constructing an equipment troubleshooting tree in accordance with various embodiments of the present disclosure. In embodiments, process 500 may begin at step 502, when a preprocessing pipeline receives an unstructured text source that comprises one or more sections. Advantageously, the preprocessing pipeline is optimized for the troubleshooting tree extraction process as well as LLM-based RAG use cases.

At step 504, a parsing tool may be used to segment the unstructured text source, e.g., to extract a listing of sections, wherein each section is associated with at least one of a component of an equipment, a unit, or a process.

At step 506, once it is determined that the parsing tool has not fully extracted the listing, the unstructured text source may be provided to a pre-trained language model that is instructed to use the listing of sections as a context to identify each section;

At step 508, metadata may be obtained for each section, including section-specific text and corresponding page range associated with the unstructured text source, and a non-static process may be applied to preprocess the section to obtain segmented data. Advantageously, this enhances a coherency of similarity matching if RAG techniques are employed.

At step 510, an indexing process may be used that increases a retrieval efficiency in a troubleshooting tree constructing pipeline by embedding the segmented data and the metadata into index nodes.

At step 512, the index nodes may be used in the troubleshooting tree constructing pipeline. The pipeline may perform steps comprising, for each component, using the pre-trained language model to generate a catalog comprising a fault, a cause, or repair recommendation, structuring at least some of them as nodes of the troubleshooting tree.

At step 514, in response to at least one of the equipment, the unit, or the process being queried by a user query, the troubleshooting tree may be generated.

At step 516, the metadata may be used in a grounding process that evaluates an accuracy of the troubleshooting tree. The grounding process may comprise cross-referencing at least some of the troubleshooting tree with the unstructured text source. The grounding proceed, thus, improves the reliability of information in the troubleshooting tree and provides means to cross-check with the source data for verification.

Finally, at step 518, the troubleshooting tree may be output. In this manner, the pipeline can automatically generate an initial instance of the troubleshooting tree using various sources of information, such as service manuals. If needed, the initial instance can be verified and improved by humans for final use requiring relatively little effort.

Advantageously, in applications such as creating a troubleshooting tree, this will significantly reduce the time consumption, potentially saving several months.

One skilled in the art shall recognize that: (1) certain steps may optionally be performed; (2) steps may not be limited to the specific order set forth herein; (3) certain steps may be performed in different orders; and (4) certain steps may be done concurrently.

Figure 6:
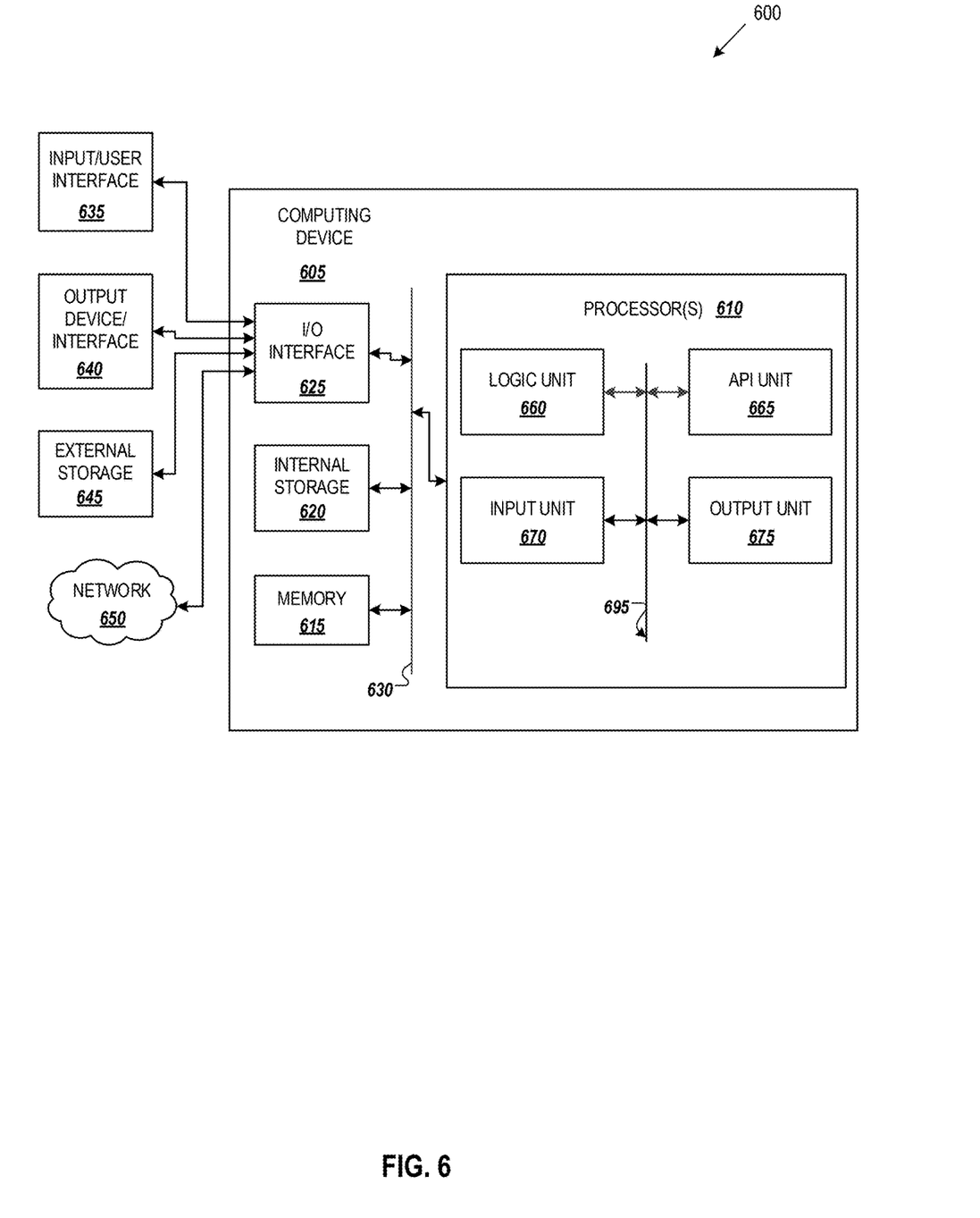
FIG. 6 illustrates an example computing environment with an example computer device suitable for use in some example implementations.

FIG. 6 illustrates an example computing environment with an example computer device suitable for use in some example implementations. Computer device 605 in computing environment 600 can include one or more processing units, cores, or processors 610, memory 615 (e.g., RAM, ROM, and/or the like), internal storage 620 (e.g., magnetic, optical, solid-state storage, and/or organic), and/or I/O interface 625, any of which can be coupled on a communication mechanism or bus 630 for communicating information or embedded in the computer device 605. I/O interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via I/O interface 625) to external storage 645 and network 650 for communicating with any number of networked components, devices, and systems, including one or more computer devices of the same or different configurations. Computer device 605 or any connected computer device can be functioning as, providing services of, or referred to as a server, client, thin server, general machine, special-purpose machine, or another label.

I/O interface 625 can include wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, a satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided. Processor(s) 610 can be in the form of hardware processors such as central processing units (CPUs) or a combination of hardware and software units.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, and output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

Processor(s) 610 can be configured to execute a method or computer instructions which can involve, at a preprocessing pipeline, receiving an unstructured text source comprising sections; using a parsing tool to segment the unstructured text source to extract a listing of sections, each section being associated with at least one of a component of an equipment, a unit, or a process; in response to determining that the parsing tool has not fully extracted the listing, performing steps comprising: providing the unstructured text source to a pre-trained language model; and instructing the pre-trained language model to identify each section, by using the listing of sections as a context, as described, for example, with respect to FIG. 3.

For each section, processor(s) 610 can perform steps comprising: obtaining metadata comprising a section-specific text and a corresponding page range associated with the unstructured text source; and applying a non-static process, which enhances a coherency of a similarity matching, to preprocess the section to obtain segmented data, as illustrated in FIG. 3.

Processor(s) 610 can use an indexing process that increases a retrieval efficiency in a troubleshooting tree constructing pipeline by embedding the segmented data and the metadata into index nodes; use the index nodes in the troubleshooting tree constructing pipeline, which performs steps comprising, for each component: using the pre-trained language model to generate a catalog comprising a fault, a cause, or repair recommendation; and structuring at least some of them as nodes of the troubleshooting tree, as illustrated in FIG. 1.

Processor(s) 610 can, in response to at least one of the equipment, the unit, or the process being queried by a user query, to generate the troubleshooting tree; use the metadata in a grounding process that evaluates an accuracy of the troubleshooting tree, the grounding process comprising cross-referencing at least some of the troubleshooting tree with the unstructured text source; and output the troubleshooting tree, as described, for example, with respect to FIG. 3.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities to achieve a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a computer-readable storage medium or a computer-readable signal medium. A computer-readable storage medium may involve tangible mediums such as optical disks, magnetic disks, read-only memories, random access memories, solid-state devices, drives, or any other types of tangible or non-transitory media suitable for storing electronic information. A computer-readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

The invention claimed is:
1. A method for constructing an equipment troubleshooting tree, the method comprising:
  at a preprocessing pipeline, receiving an unstructured text source comprising sections;
  using a parsing tool to segment the unstructured text source to extract a listing of sections, each section being associated with at least one of a component of an equipment, a unit, or a process;
  in response to determining that the parsing tool has not fully extracted the listing, performing steps comprising:
    providing the unstructured text source to a pre-trained language model; and
    instructing the pre-trained language model to identify each section, by using the listing of sections as a context;
  for each section, performing steps comprising:
    obtaining metadata comprising a section-specific text and a corresponding section title and page range associated with the unstructured text source; and
    applying a non-static process, which enhances a coherency of a similarity matching, to preprocess the section to obtain segmented data;
  using an indexing process that increases a retrieval efficiency in a troubleshooting tree constructing pipeline by embedding the segmented data and the metadata into index nodes;
  using the index nodes in the troubleshooting tree constructing pipeline, which performs steps comprising, for each component:
    using the pre-trained language model to generate a catalog comprising a fault, a cause, or repair recommendation; and
    structuring at least some of the fault, a cause, or repair recommendation as nodes of the troubleshooting tree;
  in response to at least one of the equipment, the unit, or the process being queried by a user query, generating the troubleshooting tree;
  using the metadata in a grounding process that evaluates an accuracy of the troubleshooting tree, the grounding process comprising cross-referencing at least some of the troubleshooting tree with the unstructured text source; and
  outputting the troubleshooting tree.
2. The method of claim 1, wherein one or more of the index nodes comprises pre-processed textual data.
3. The method of claim 1, further comprising:
  extracting new text data from updated unstructured text;
  using the pre-trained language model to generate a troubleshooting branch that is associated with previously unidentified issues;
  integrating the troubleshooting branch into the troubleshooting tree to obtain an updated troubleshooting tree; and
  verifying the troubleshooting tree against new source material to enhance an accuracy.
4. The method of claim 3, wherein the troubleshooting tree is structured to facilitate expansion and enhancement using data from previously unseen unstructured text sources.
5. The method of claim 1, wherein the user query comprises a prompt to generate, for one of more steps, an output comprising at least one of the component, the fault, the cause, or the repair recommendation.
6. The method of claim 5, wherein the output is generated as a Python list.
7. The method of claim 1, wherein the unstructured text sources comprise at least one of a service log, a service manual, or an owner manual.

8. The method of claim 1, wherein the indexing process comprises a database indexing.

9. The method of claim 1, further comprising instructing the pre-trained language model to identify each section as a set of separate documents.

10. The method of claim 1, wherein the section-specific text comprises a section name.

11. The method of claim 1, wherein the pre-trained language model employs a retrieval augmented generation process that retrieves information.

12. The method of claim 11, wherein the grounding process further comprises evaluating an output of the pre-trained language model against a context that is used to retrieve the information.

13. The method of claim 11, wherein the grounding process further comprises providing references to one or more of the sections, which contains information that enables a user verification of the accuracy of the troubleshooting tree to improve an output accuracy.

14. A non-transitory computer-readable medium for storing instructions for executing a process, the instructions comprising:
   at a preprocessing pipeline, receiving an unstructured text source comprising sections;
   using a parsing tool to segment the unstructured text source to extract a listing of sections, each section being associated with at least one of a component of an equipment, a unit, or a process;
   in response to determining that the parsing tool has not fully extracted the listing, performing steps comprising:
      providing the unstructured text source to a pre-trained language model; and
      instructing the pre-trained language model to identify each section, by using the listing of sections as a context;
   for each section, performing steps comprising:
      obtaining metadata comprising a section-specific text and a corresponding section title and page range associated with the unstructured text source; and
      applying a non-static process, which enhances a coherency of a similarity matching, to preprocess the section to obtain segmented data;
   using an indexing process that increases a retrieval efficiency in a troubleshooting tree constructing pipeline by embedding the segmented data and the metadata into index nodes;
   using the index nodes in the troubleshooting tree constructing pipeline, which performs steps comprising, for each component:
      using the pre-trained language model to generate a catalog comprising a fault, a cause, or repair recommendation; and
      structuring at least some of the fault, a cause, or repair recommendation as nodes of the troubleshooting tree;
   in response to at least one of the equipment, the unit, or the process being queried by a user query, generating the troubleshooting tree;
   using the metadata in a grounding process that evaluates an accuracy of the troubleshooting tree, the grounding process comprising cross-referencing at least some of the troubleshooting tree with the unstructured text source; and
   outputting the troubleshooting tree.

15. The non-transitory computer-readable medium of claim 14, wherein the pre-trained language model employs a retrieval augmented generation process that retrieves information.

16. The non-transitory computer-readable medium of claim 15, wherein the grounding process further comprises evaluating an output of the pre-trained language model against a context that is used to retrieve the information.

17. The non-transitory computer-readable medium of claim 15, wherein the grounding process further comprises providing references to one or more sections, which contains information that enables a user verification of the accuracy of the troubleshooting tree to improve an output accuracy.

18. The non-transitory computer-readable medium of claim 14, wherein one or more of the index nodes comprises pre-processed textual data.

19. The non-transitory computer-readable medium of claim 14, further comprising:
   extracting new text data from updated unstructured text;
   using the pre-trained language model to generate a troubleshooting branch that is associated with previously unidentified issues;
   integrating the troubleshooting branch into the troubleshooting tree to obtain an updated troubleshooting tree; and
   verifying the troubleshooting tree against new source material to enhance an accuracy.

20. The non-transitory computer-readable medium of claim 19, wherein the troubleshooting tree is structured to facilitate expansion and enhancement using data from previously unseen unstructured text sources.

\* \* \* \* \*